(12) United States Patent
Diril et al.

(10) Patent No.: US 11,663,043 B2
(45) Date of Patent: May 30, 2023

(54) HIGH BANDWIDTH MEMORY SYSTEM WITH DYNAMICALLY PROGRAMMABLE DISTRIBUTION SCHEME

(71) Applicant: Meta Platforms, Inc., Menlo Park, CA (US)

(72) Inventors: Abdulkadir Utku Diril, Menlo Park, CA (US); Olivia Wu, Los Altos, CA (US); Krishnakumar Narayanan Nair, Newark, CA (US); Anup Ramesh Kadkol, Sunnyvale, CA (US); Aravind Kalaiah, San Jose, CA (US); Pankaj Kansal, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 405 days.

(21) Appl. No.: 16/701,019

(22) Filed: Dec. 2, 2019

(65) Prior Publication Data
US 2021/0165691 A1  Jun. 3, 2021

(51) Int. Cl.
| | | |
|---|---|---|
| *G06F 7/10* | (2006.01) | |
| *G06F 9/50* | (2006.01) | |
| *G06F 9/38* | (2018.01) | |
| *G06F 9/445* | (2018.01) | |
| *G06F 9/54* | (2006.01) | |
| *G06F 12/02* | (2006.01) | |

(52) U.S. Cl.
CPC .......... *G06F 9/5016* (2013.01); *G06F 9/3897* (2013.01); *G06F 9/44505* (2013.01); *G06F 9/542* (2013.01); *G06F 9/544* (2013.01); *G06F 12/0246* (2013.01)

(58) Field of Classification Search
CPC .. G06F 9/5016; G06F 9/3897; G06F 9/44505; G06F 9/542; G06F 9/544; G06F 12/0246; G06F 12/0284; G06F 2212/1016; G06F 12/0607; G06F 13/126; G06F 13/1673; G06N 3/0454; G06N 3/063; Y02D 10/00
See application file for complete search history.

(56) References Cited

U.S. PATENT DOCUMENTS

| | | |
|---|---|---|
| 2001/0042174 A1 | 11/2001 | Gupta |
| 2005/0060482 A1 | 3/2005 | Ishikawa |

(Continued)

OTHER PUBLICATIONS

Anna Pupykina et al. "Survey of Memory Management Techniques for HPC and Cloud Computing", version 2016 (Year: 2016).*

(Continued)

*Primary Examiner* — Andy Ho
*Assistant Examiner* — Abdou K Seye
(74) *Attorney, Agent, or Firm* — Van Pelt, Yi & James LLP

(57) ABSTRACT

A system comprises a processor coupled to a plurality of memory units. Each of the plurality of memory units includes a request processing unit and a plurality of memory banks. The processor includes a plurality of processing elements and a communication network communicatively connecting the plurality of processing elements to the plurality of memory units. At least a first processing element of the plurality of processing elements includes a control logic unit and a matrix compute engine. The control logic unit is configured to access data from the plurality of memory units using a dynamically programmable distribution scheme.

20 Claims, 6 Drawing Sheets

(56) References Cited

U.S. PATENT DOCUMENTS

2011/0320767 A1* 12/2011 Eren ..................... G06N 20/00
    712/30
2016/0048327 A1    2/2016 Jayasena
2017/0139629 A1*  5/2017 Van Lunteren ..... G06F 12/0292
2019/0392297 A1* 12/2019 Lau ......................... G06N 3/04

OTHER PUBLICATIONS

Extended European Search Report for European Application No. 20205410.2, dated Apr. 30, 2021, 10 Pages.

* cited by examiner

HIGH BANDWIDTH MEMORY SYSTEM WITH DYNAMICALLY PROGRAMMABLE DISTRIBUTION SCHEME

BACKGROUND OF THE INVENTION

A whole class of complex artificial intelligence problems can be solved using neural networks. Since these problems are often computationally and data intensive, hardware solutions are often beneficial for improving the performance of neural networks. Since the solutions typically require processing large amounts of data, the performance of memory-based operations is critical. It is a technical challenge to create a hardware platform for solving neural networks while achieving memory access performance and efficiency requirements. Therefore, there exists a need for a hardware platform with a memory access and layout scheme that is able to effectively perform memory operations needed for neural network processing.

BRIEF DESCRIPTION OF THE DRAWINGS

Various embodiments of the invention are disclosed in the following detailed description and the accompanying drawings.

DETAILED DESCRIPTION

Figure 1:
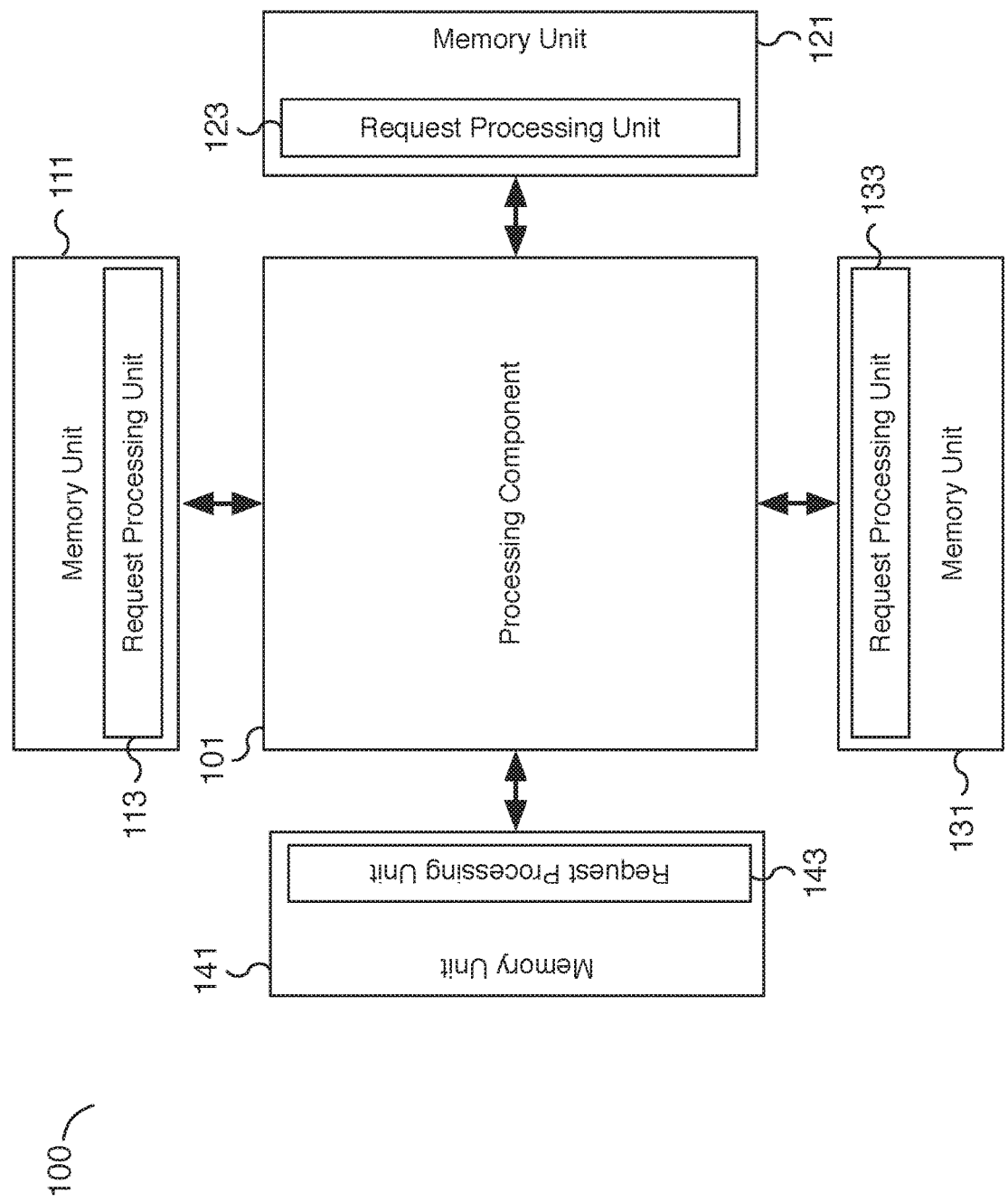
FIG. 1 is a block diagram illustrating an embodiment of a system for solving artificial intelligence problems using a neural network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A high bandwidth memory system is disclosed. The memory units of a processor system are arranged surrounding a processing component. In some embodiments, the processing component is arranged in a central location relative to the multiple memory units, which may include separate north, east, south, and west memory units. The processing component can be a processor with multiple processing elements, where each processing element includes its own control logic and matrix compute engine. Processing elements of the processor can work together in parallel by applying a neural network to solve complex artificial intelligence problems. The processing elements are part of the disclosed high bandwidth memory system for efficiently transferring data between memory and the processing component. Each processing element of the processing component can be configured with a distribution scheme to scatter data across the available memory units. The distribution scheme is dynamically programmable such that different processing elements can apply the same or different distribution schemes. For example, in various embodiments, each processing element can be programmed using a processor instruction to dynamically configure the distribution scheme for that processing element. In various embodiments, processing elements sharing the same workload can be programmatically configured to utilize the same distribution scheme and processing elements with different workloads can be programmatically configured to utilize different distribution schemes. Different distribution schemes help to prevent multiple processing elements from working in lockstep with one another. By varying the distribution schemes, the memory units are more efficiently utilized and memory performance is increased. For example, full or close to full bandwidth utilization can be achieved with memory units/banks and memory ports being more equally utilized. Moreover, the disclosed invention significantly improves power savings and reduces latency when accessing memory. In some embodiments, the size of the memory unit access units is also configurable. For example, the size of the memory unit access units can be programmatically configured via a processor instruction. Each processing element can read and/or write data to each memory unit using a configurable access unit-sized group. Moreover, memory access operations can span multiple access units and reference data distributed across multiple memory units. In various embodiments, each memory access request is broadcasted to all memory units and each memory unit returns partial responses that are combined to fulfill the broadcasted request.

In some embodiments, a processor system comprises a plurality of memory units and a processor coupled to the plurality of memory units. For example, a processor system includes a processor communicatively connected to multiple memory units. In some embodiments, the memory units are arranged on all sides of the processor to help minimize latency from the processor to each memory unit. Each of the plurality of memory units includes a request processing unit and a plurality of memory banks. For example, a request processing unit receives memory access requests, such as read and/or write requests, and determines whether and how to processes the requests. The request processing unit can determine whether a portion of the memory access request can be served by the memory unit and its corresponding memory banks. For example, the request processing unit can decompose a memory access request into partial requests and determine what subset of the partial requests may be served from the corresponding memory banks of the memory unit. In various embodiments, each memory unit can include multiple memory banks to increase the memory size of a memory unit. For example, a memory unit can include 4, 8, 16, 32, or another appropriate number of memory banks. In some embodiments, the processor includes a plurality of processing elements. For example, the processor is a processing component that includes a group of processing elements. The processing elements may be arranged in a matrix, such as an 8×8 array or grid of processing elements. The processor also includes a communication network communicatively connecting the plurality of processing elements to the plurality of memory units. For example, a communication network such as a network-on-chip subsystem and/or network interfaces/buses communicatively connect each processing element to each memory unit. In some embodiments, each processing element of the plurality of processing elements includes a control logic unit and a matrix compute engine. For example, a first processing element of the plurality of processing elements includes a control logic for controlling the first processing element and a matrix compute engine for computing matrix operations. The control logic is configured to access data from the plurality of memory units using a dynamically programmable distribution scheme. For example, the control logic is configured using a processor instruction to utilize a specific distribution scheme or pattern. The scheme may be based on the processing element workload or another appropriate configuration. The distribution scheme determines the mapping of memory addresses specific to the processing element to memory locations of the memory units.

FIG. 1 is a block diagram illustrating an embodiment of a system for solving artificial intelligence problems using a neural network. In the example shown, the system 100 is a hardware platform that includes processing component 101 and memory units 111, 121, 131, and 141. Memory units 111, 121, 131, and 141 each include one of request processing units 113, 123, 133, and 143, respectively. Processing component 101 is communicatively connected to memory units 111, 121, 131, and 141. Processing component 101 is connected to and can communicate with each of memory unit 111, 121, 131, and 141 simultaneously. The memory units 111, 121, 131, and 141 are positioned around processing component 101 but other layouts are appropriate. By positioning memory units 111, 121, 131, and 141 around processing component 101, memory units 111, 121, 131, and 141 can be accessed simultaneously by processing component 101 and/or multiple connections may be used by processing component 101 to communicate with different memory units 111, 121, 131, and 141 in parallel. In the example shown, system 100 includes four memory units that surround a processing component but fewer or more memory units may be utilized as appropriate.

In some embodiments, processing component 101 is a processor that includes one or more processing elements (not shown). Each processing element may include at least a matrix compute engine for performing matrix operations. The processing elements may be further communicatively connected using a communication network and/or bus such as a network-on-chip subsystem. Data for performing neural network operations may be retrieved from and written to memory units such as memory units 111, 121, 131, and 141 located around processing component 101. For example, using a network-on-chip subsystem, memory access operations can be directed to memory, including memory units 111, 121, 131, and 141, from a processing element of processing component 101. In some embodiments, each processing element can be assigned a particular workload and each workload may be associated with a particular set of data stored in memory. For example, the set of data for a workload may include activation and/or filter matrix data. In various embodiments, the data is associated with large neural network matrices and may include hundreds or more matrix elements. The relevant data may be stored across different regions of memory units 111, 121, 131, and 141. In some embodiments, the data is stored in access unit-sized groups distributed across memory units 111, 121, 131, and 141 based on a dynamically programmable distribution scheme.

In some embodiments, the data may be accessed by workload or another appropriate identifier. For example, a workload identifier may be used to determine how to distribute and retrieve data across the different available memory units. In various embodiments, different workloads are programmed to distribute their corresponding workload data across available memory units using different distribution schemes. For example, each workload can be dynamically programmed to use a different distribution scheme. In various embodiments, a distribution scheme uses a configurable ordered pattern for accessing memory units. Instead of using a predefined distribution for all workloads, a processing element can be dynamically programmed to distribute data differently from other processing elements. This allows for better utilization and efficiency of the memory units. In various embodiments, the data associated with a memory access operation may reside in one or more different memory units. For example, a memory read request may be served by data located in memory units 111, 121, and 131. A different memory request may be served by data in memory units 121, 131, and 141. In some embodiments, a hash function, such as a programmable hash function, is used to determine the memory layout scheme or access order pattern for a particular workload or identifier. For example, a memory read request for one processing element may access memory units using a repeating ordered pattern starting with memory unit 111 followed by memory unit 121, memory unit 131, and memory unit 141. A memory read request for a different processing element may use a different programmable repeating ordered pattern starting with memory unit 141 followed by memory unit 121, memory unit 131, and memory unit 111. Since data is distributed across different memory units, a memory request can trigger one or more partial responses from different memory units that each respond to a portion of the memory request. Once all partial responses have been received by a processing element, the memory request is complete.

In some embodiments, memory units 111, 121, 131, and 141 each include one of request processing units 113, 123, 133, and 143, respectively, to process memory access operations. A memory access operation, such as a write or read memory access operation, can be split into multiple partial access requests. In some embodiments, the memory access operation is decomposed or unrolled into one or more partial access requests by one or more request processing units such as request processing units 113, 123, 133, and/or 143. Based on the memory range requested, a request processing unit determines whether its associated memory unit contains the requested data. For example, in some embodiments, a memory request is broadcasted to all memory units and is processed by the corresponding request processing unit of each memory unit. Each request processing unit analyzes the request and different request processing units respond to different portions of the memory request. For example, a request processing unit responds only to requests for data or memory addresses associated with its memory unit. Request processing unit 113 responds to requests associated with memory unit 111, request processing unit 123 responds to requests associated with memory unit 121, request processing unit 133 responds to requests associated with memory unit 131, and request processing unit 143 responds to requests associated with memory unit 141. In the event a memory access request can be served by a particular memory unit, the associated request processing unit can retrieve the relevant data from (or write the relevant data to) the associated memory unit. Memory access requests that cannot be served by the particular memory unit can be ignored and will be handled by the corresponding appropriate memory unit. In some embodiments, each memory unit contains multiple memory banks and the request processing unit can direct the partial memory access request to the appropriate memory bank of the memory unit.

In some embodiments, the size of a data access unit used by each memory unit is programmable. For example, memory units can be programmed to use a 128 byte or another appropriately sized access unit such that every new group of 128 bytes (or another appropriate access unit size) is stored on a different memory unit based on the programmable distribution scheme. This allows the data to be written across different memory units using programmable sized access units. For example, the first access unit of data is written to a first memory unit, the second access unit of data is written to a second memory unit, and so forth, as determined by the ordering of the distribution scheme. Once all memory units have been utilized, the next memory unit cycles back to the first memory unit. In various embodiments, the order of the memory units can also be programmable and may be determined using a hashing function. For example, each workload may utilize a different distribution order for accessing memory units based on the outcome of the hashing function.

Figure 2:
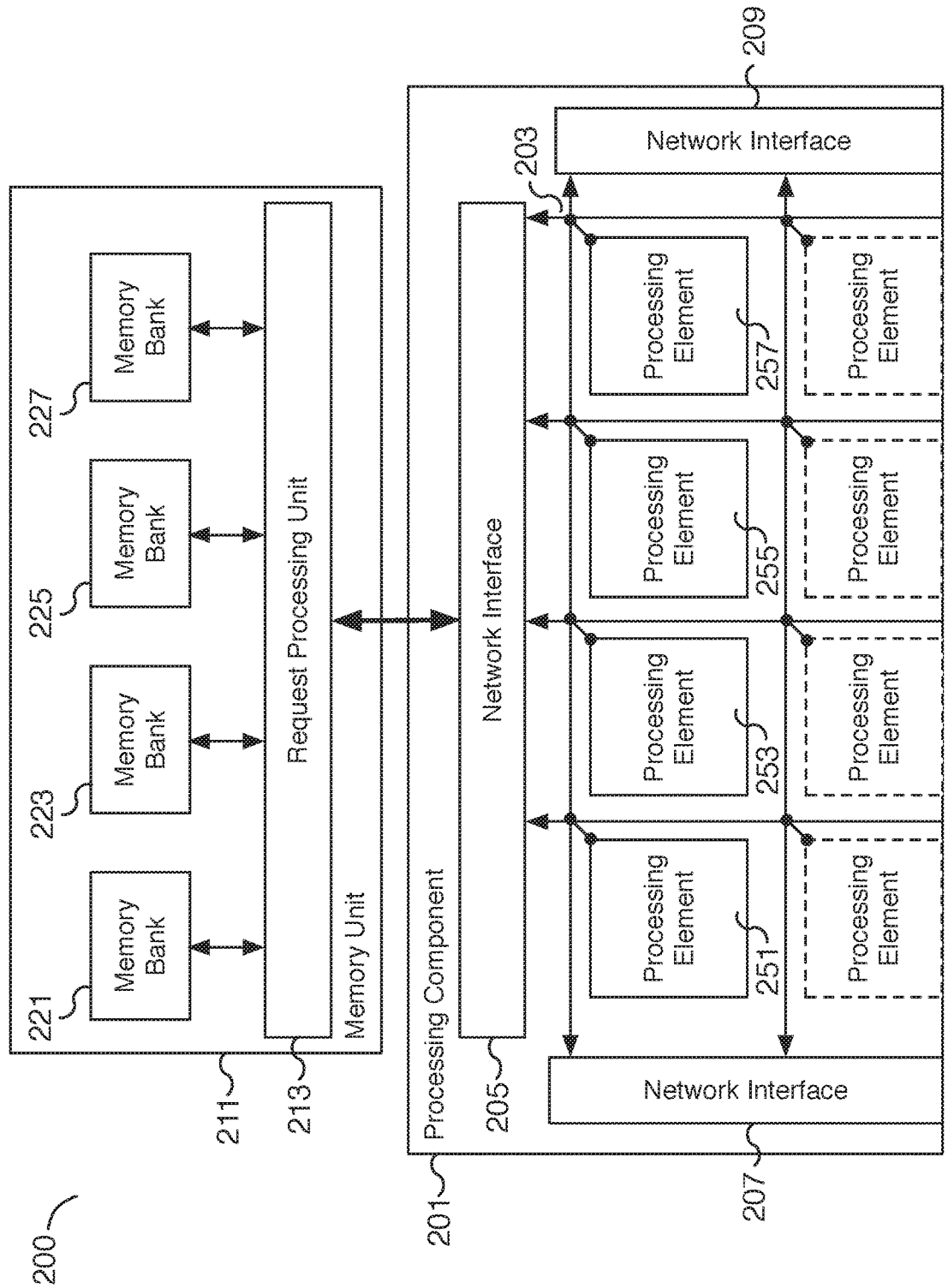
FIG. 2 is a block diagram illustrating an embodiment of a system for solving artificial intelligence problems using a neural network.

FIG. 2 is a block diagram illustrating an embodiment of a system for solving artificial intelligence problems using a neural network. In the example shown, the system 200 is a partial depiction of a hardware platform that includes processing component 201 and memory unit 211. Additional memory units may be included but are not displayed. Similarly, additional components may be included in the hardware system but are not displayed. In some embodiments, processing component 201 is processing component 101 of FIG. 1 and memory unit 211 is memory unit 111, 121, 131, or 141 of FIG. 1. In various embodiments, the functionality described with respect to processing component 201 and memory unit 211 applies to other memory units connected to processing component 201 that are not shown in FIG. 2.

In some embodiments, processing component 201 is a processor that includes multiple processing elements such as processing elements 251, 253, 255, and 257. Additional processing elements are illustrated with dotted lines to reflect the inclusion of additional processing elements that function in a similar manner as processing elements 251, 253, 255, and 257. In the diagram of FIG. 2, only a portion of processing component 201 is shown. Processing component 201 includes network-on-chip subsystem 203 with network interfaces 205, 207 and 209. Network-on-chip subsystem 203 is a communication network and/or communication bus that communicatively connects the processing elements, including processing elements 251, 253, 255, and 257, and network interfaces, such as network interfaces 205, 207 and 209, to one another. Network-on-chip subsystem 203 can be used for processing elements to communicate with one another and/or to communicate with memory units such as memory unit 211. Network interface 205 connects processing component 201 to memory unit 211 on the north side of processing component 201. For example, processing element 251 of processing component 201 can interface with memory unit 211 via network-on-chip subsystem 203 and network interface 205 to read and/or write data from memory. In various embodiments, network interface 207 is used to connect processing component 201 to a memory unit (not shown) on the west side of processing component 201 and network interface 209 is used to connect processing component 201 to a memory unit (not shown) on the east side of processing component 201. An additional network interface (not shown) may be included to connect processing component 201 to a memory unit placed on the south side of processing component 201. The example of FIG. 2 focuses on the interface between processing component 201 and a single memory unit, memory unit 211, but the techniques disclosed are applicable to other memory units (not shown) as well.

In some embodiments, memory unit 211 includes request processing unit 213 and multiple memory banks such as memory banks 221, 223, 225, and 227. Request processing unit 213 receives memory access requests from processing elements of processing component 201. The memory access requests may be read and/or write requests. Request processing unit 213 decomposes the memory access request to determine whether it can be served, potentially partially, by one of the memory banks of memory unit 211. Although four memory banks are shown in FIG. 2, in various embodiments, memory unit 211 can include fewer or many more memory banks such as 8, 16, 32, 64, or another appropriate number of memory banks. In some embodiments, request processing unit 213 directs memory access requests to the appropriate memory bank(s) of memory unit 211. For example, based on the memory address of the request, request processing unit 213 determines the appropriate memory bank(s) to access. In some embodiments, two or more memory banks of memory unit 211 may be accessed for a single memory access request. The memory units and banks may be determined based on a hashing function. For example, the hashing function may utilize a workload identifier of a processing element requesting access to the address range. In some embodiments, the hashing function inspects a set of bits, such as two or more bits, of a memory address associated with the memory access request to map an address range to a memory unit.

In some embodiments, the memory read/write size, such as the size of a memory access unit, can be programmable. For example, memory reads can be programmed to be 64 bytes, 128 bytes, or another appropriate access unit size. Request processing unit 213 can determine the appropriate bytes to read and/or write by analyzing each incoming memory access request. In the event a request can be served by the memory unit, such as memory unit 211, a memory request response will be returned to processing component 201 and the appropriate requesting processing element(s). In some embodiments, request processing unit 213 prepares a response. For example, a response prepared may include data read from a memory bank. The response may be a partial response that fulfills only a portion of the original memory access request. Additional partial responses may be fulfilled by other memory units (not shown) responsible for managing the corresponding memory address ranges. For example, a large memory read request broadcasted to all memory units may be fulfilled by multiple partial responses supplied by multiple memory units. In some embodiments, each partial response includes an identifier such as a sequence identifier that may be used to order the partial responses. For example, partial responses may not be received in order and an identifier is used to sort the partial responses and build a complete response from multiple partial responses.

Figure 3:
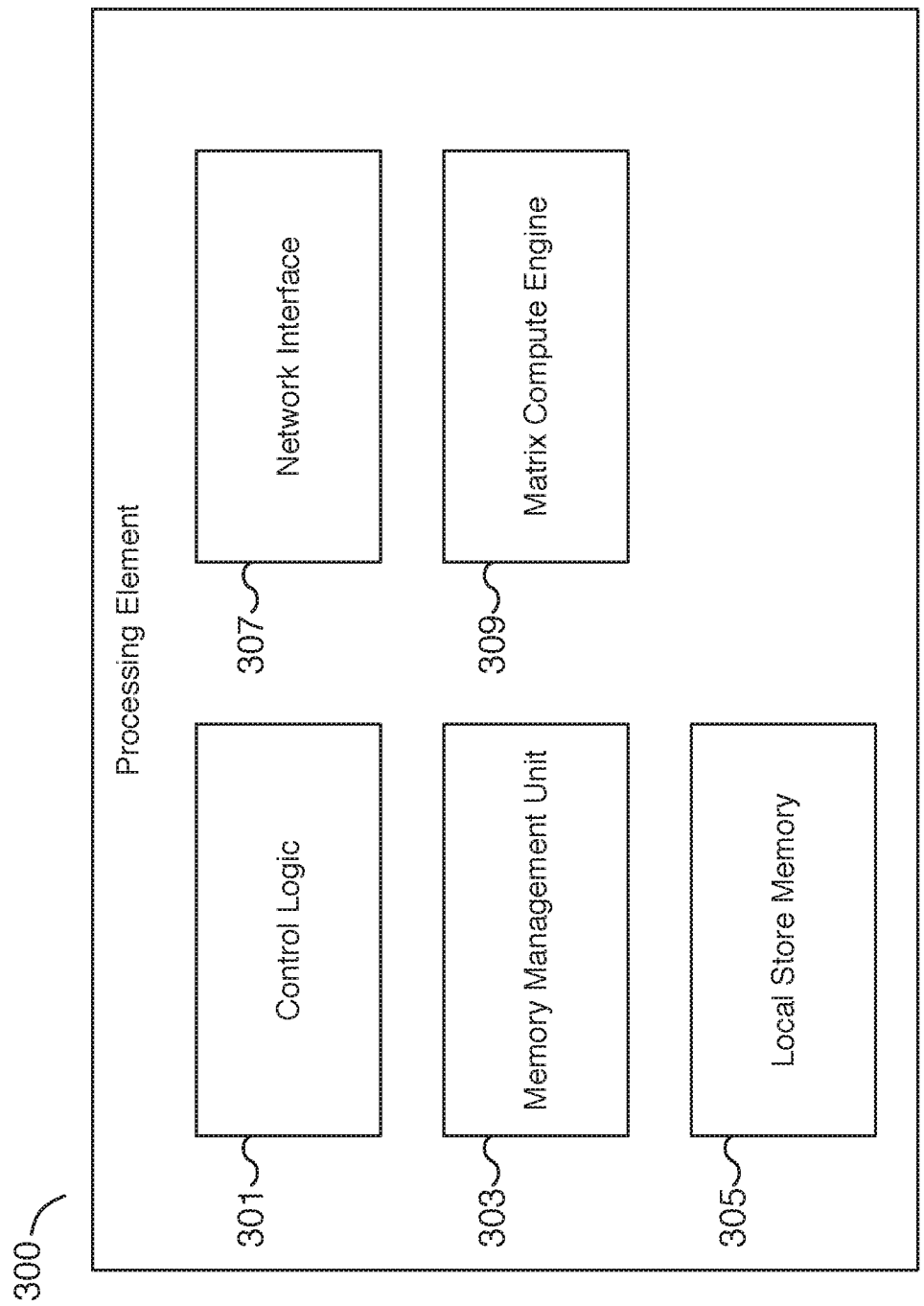
FIG. 3 is a block diagram illustrating an embodiment of a processing element for solving artificial intelligence problems using a neural network.

FIG. 3 is a block diagram illustrating an embodiment of a processing element for solving artificial intelligence problems using a neural network. In the example shown, processing element 300 includes control logic 301, memory management unit 303, local store memory 305, network interface 307, and matrix compute engine 309. In various embodiments, one or more processing elements can work together on the same data set or workload to solve an artificial intelligence program using a large working data set. In some embodiments, processing element 300 is a processing element of processing component 101 of FIG. 1 and/or processing component 201 of FIG. 2. In some embodiments, processing element 300 is processing element 251, 253, 255, and/or 257 or another processing element of FIG. 2.

In some embodiments, local store memory 305 is a memory scratchpad for storing data such as data related to neural network operations. Local store memory 305 may be used for storing data retrieved via partial responses to memory access requests. Partial responses and the associated data may be gathered and stored in local store memory 305 to build a complete response. In some embodiments, local store memory 305 is made up of registers for fast read and write access. In various embodiments, one or more components of processing element 300, such as matrix compute engine 309, can access local store memory 305. For example, matrix input data operands and/or output data results can be stored in local store memory 305.

In some embodiments, control logic 301 is a control logic unit for directing the functionality of processing element 300 and may be used to interface with the components of processing element 300 such as memory management unit 303, local store memory 305, network interface 307, and matrix compute engine 309. In some embodiments, control logic 301 may respond to processor instructions used to apply a neural network to an artificial intelligence problem. For example, control logic 301 can be used to initiate reading and/or writing of data from memory via network interface 307 in response to a processing instruction. In some embodiments, control logic 301 is used to load and prepare operating arguments for matrix compute engine 309. For example, control logic 301 can prepare matrix operands for computing a convolution operation. In some embodiments, control logic 301 is used to help process partial responses to a memory data request.

In some embodiments, memory management unit 303 is used to manage memory related functionality of processing element 300. For example, memory management unit 303 may be used to program the access unit size used for reading data from and/or writing data to memory units such as memory units 111, 121, 131, and/or 141 of FIG. 1. In some embodiments, a large memory read is divided into access unit size groups and one of the available memory units is responsible for servicing each memory group. Distributing the data across memory units in access unit-sized groups allows memory to be accessed much more efficiently and significantly improves memory utilization. In some embodiments, memory management unit 303 is used to configure a hashing mechanism for distributing the data across different memory units. For example, memory management unit 303 can manage configurations associated with a programmable hashing mechanism. In some embodiments, memory management unit 303 is part of control logic 301. Instead of using a fixed distribution pattern for all memory access operations, the programmable hashing mechanism allows the distribution pattern to be configurable. For example, different processing element workloads can use different distribution patterns. As one example, one workload can be configured to write to memory units using a north, east, south, west pattern while another workload can be configured to write to the memory units using a south, north, east, west pattern. In various embodiments, the distribution scheme is dynamic and can be dynamically programmed via control logic 301 and memory management unit 303. Memory management unit 303 is used to help map local memory addresses to different memory access unit-sized groups found in different memory units.

In some embodiments, network interface 307 is used to interface with a network subsystem such as a network-on-chip system for network communication. In some embodiments, the network subsystem that network interface 307 communicates with is network-on-chip subsystem 203 of FIG. 2. Memory access requests from and to processing element 300 such as read and write requests are transmitted via network interface 307.

In some embodiments, matrix compute engine 309 is a hardware matrix processor unit for performing matrix operations including operations related to convolution operations. For example, matrix compute engine 309 may be a dot product engine for performing dot product operations. In some embodiments, the convolution operations supported include depthwise, groupwise, normal, regular, pointwise, and/or three-dimensional convolutions, among others. For example, matrix compute engine 309 may receive a first input matrix such as a subset of a large image represented as a three-dimensional matrix. The first input matrix may have the dimensions height×width×channel (HWC), channel×height×width (CHW), or another appropriate layout format. Matrix compute engine 309 may also receive a second input matrix such as a filter, kernel, or weights, etc. to apply to the first input matrix. Matrix compute engine 309 can be used to perform a convolution operation using the two input matrices to determine a resulting output matrix. In some embodiments, matrix compute engine 309 may include input and/or output buffers for loading input data matrices and writing out a result data matrix. The data used by matrix compute engine 309 may be read from and/or written to local store memory 305 and/or external memory such as memory units 111, 121, 131, and/or 141 of FIG. 1.

Figure 4:
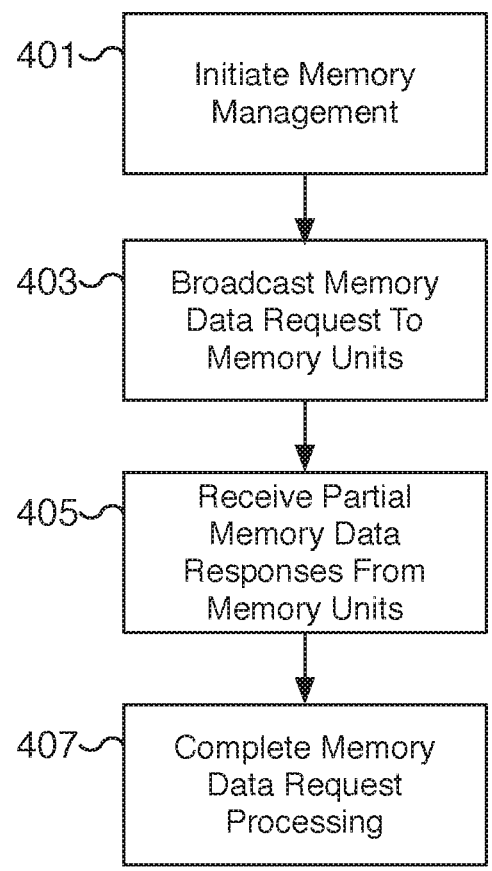
FIG. 4 is a flow chart illustrating an embodiment of a process for performing memory access.

FIG. 4 is a flow chart illustrating an embodiment of a process for performing memory access. For example, an artificial intelligence problem is solved by applying a neural network using data associated with the problem and the neural network. The data is read from and written to memory such as memory units 111, 121, 131, and/or 141 of FIG. 1 by a processing element such as processing elements 251, 253, 255, and 257 of FIG. 2. In some embodiments, the process of FIG. 4 is performed by one or more processing elements of processing component 101 of FIG. 1 and/or processing component 201 of FIG. 2. In some embodiments, the process of FIG. 4 is performed by processing element 300 of FIG. 3.

Using the process of FIG. 4, data elements stored in memory can be distributed across multiple memory units to improve the utilization of memory and the efficiency of memory access operations.

At 401, memory management is initiated. For example, a particular memory access distribution scheme is configured at 401. The configuration may be initiated using a processor instruction such as an instruction directed to a particular processing element. The distribution scheme may be associated with a particular workload such as a particular artificial intelligence problem and neural network. In some embodiments, the initialization includes setting a workload identifier. For example, a workload identifier can be used to configure how data is distributed across multiple memory units. The workload identifier may be a parameter to a processor memory management instruction. Each workload can use a different distribution scheme to improve the utilization and efficiency of memory. Processing elements working on the same dataset or workload can utilize the same workload identifier to share data. By scattering data across memory units using different distribution patterns, such as different distribution patterns for each workload, the data stored in memory is more efficiently distributed across all available memory. In some embodiments, the memory initialization includes configuring the memory access unit size. For example, a memory access unit, such as 128 bytes, 256 bytes, etc., can be configured such that data is written to each memory unit in access unit-sized groups. Larger or smaller access units can be used as appropriate. Data within an access unit group is stored in the same memory unit. In some embodiments, the access unit size is configurable using a programmable instruction to a processor or processing element.

In some embodiments, initialization of the memory management includes configuring or programming a hashing mechanism for distributing data across memory units. For example, a hashing mechanism can utilize a seed to configure the distribution scheme. In some embodiments, the seed is based on specifying a group of bits from a memory address to determine which memory unit is assigned to a particular access unit of data. For example, the hashing mechanism may specify two bits of the memory address, such as two upper bits, and perform a bitwise operation on the specified bits to map an access unit to a memory unit. In some embodiments, the bitwise operation utilizes an XOR operation. In some embodiments, the hashing mechanism can be programmatically configured. For example, a processing element can be configured to utilize a specified hashing function and/or be configured to utilize certain parameters for the hashing function.

At 403, a memory data request is broadcasted to memory units. For example, a request for data from memory is broadcasted to all memory units connected to the processing element of a processing component. In some embodiments, the request is transmitted via a network subsystem such as a network-on-chip subsystem 203 and corresponding network interfaces 205, 207, and/or 209 of FIG. 2. In some embodiments, four memory units, such as a north, east, south, and west memory unit, surround a processing component such as processing component 101 of FIG. 1. In the example, all four memory units, such as memory units 111, 121, 131, and 141, receive the broadcasted memory data request. In some embodiments, the data request is for a large amount of data and includes data spanning multiple access units. The request can be constructed to reference a base memory address and a size argument to determine how much data is requested starting at the base memory address. Other memory referencing schemes may be appropriate as well. In some embodiments, the broadcasted memory request also includes mapping information corresponding to the distribution scheme. For example, receiving memory units can use the mapping information to determine the hashing mechanism and/or hashing mechanism parameter(s) programmatically configured at 401. As another example, the mapping information may also include the programmatically configured access unit size. In various embodiments, the memory data request may be provided to memory units for reading data or writing data.

At 405, partial memory data responses are received from memory units. For example, two or more partial memory data responses are received from two or more different memory units. The partial responses are responses to the memory data request broadcasted at 403. Since the memory request spans multiple access units, multiple memory units can respond, each providing a partial response corresponding to different access units, to complete the entire request. Each memory unit creates one or more partial responses associated with the one or more access units it is responsible for. For example, data associated with a memory request can be spread across three memory units. Each of the three memory units responds with a partial memory data response. At 405, the partial memory responses are received. In some embodiments, each response includes an identifier such as a sequence identifier for organizing the partial responses into a complete response.

At 407, memory data request processing is completed. For example, the partial responses are ordered into a complete response that includes all of the requested data. In various embodiments, the processing is complete only after all partial responses have been received. For example, sequence identifiers included in partial responses may be used to determine that processing is complete. Data associated with each partial response may be stored in local memory of the processing element such as local store memory 305 of FIG. 3. In some embodiments, the completed response may be utilized by more than one processing element. For example, processing elements accessing the same data may share in the utilizing of the completed memory data response.

Figure 5:
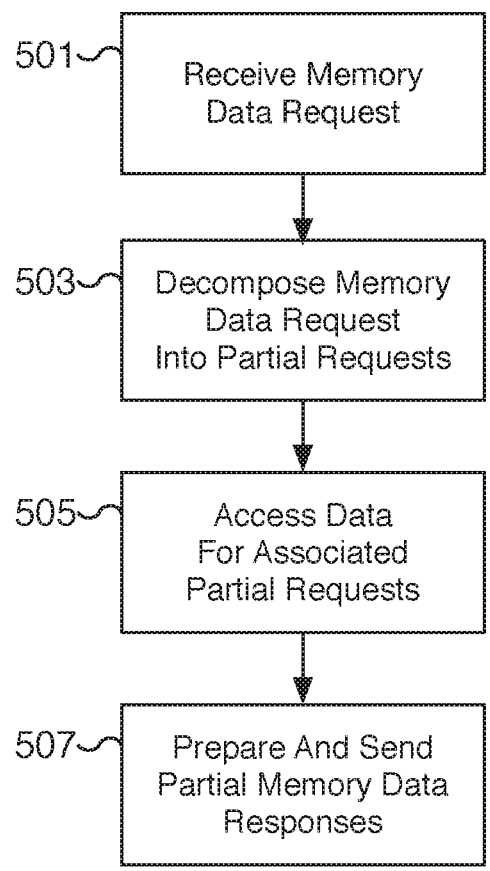
FIG. 5 is a flow chart illustrating an embodiment of a process for responding to memory data requests.

FIG. 5 is a flow chart illustrating an embodiment of a process for responding to memory data requests. For example, a request processing unit of a memory unit utilizes the process of FIG. 5 to respond to a broadcasted memory data request. The request processing unit decomposes the memory request and determines which access units the memory unit is responsible for and then prepares and sends one or more partial responses for the access units managed by the memory unit. In some embodiments, the process of FIG. 5 is performed by request processing units 113, 123, 133, and/or 143 of FIG. 1 and/or request processing unit 213 of FIG. 2. In some embodiments, the process of FIG. 5 is performed in response to a memory data request broadcasted at 403 of FIG. 4. In some embodiments, the response prepared using the process of FIG. 5 is received by a processing element at 405 of FIG. 4.

At 501, a memory data request is received. For example, a memory data request spanning multiple access units is received. Some of the access units are associated with the memory unit and others may be associated with a different memory unit. In various embodiments, multiple memory units may receive the same memory data request as a broadcasted memory data request. In some embodiments, the memory data request includes a base address and a size parameter to determine the address range requested. The memory data request may also include mapping information to determine the hashing mechanism and/or hashing mechanism parameter(s) used for the particular memory distribution scheme of the memory access request. In some embodiments, memory data request mapping information includes the access unit size.

At 503, the memory data request is decomposed into partial requests. For example, a request spanning multiple access units is split into partial requests. In some embodiments, the decomposing is performed by unrolling the memory data request into partial requests based on a configured access unit size. For example, a memory data request spanning three access units is decomposed into three partial requests, one for each access unit. As another example, in some embodiments, each memory unit is responsible for multiple access units. For example, in a scenario with a memory data request spanning 32 memory access units that are evenly distributed across four memory units, each memory unit is responsible for eight partial requests. Each partial request corresponds to a memory access unit of data managed by the memory unit.

At 505, data for associated partial requests is accessed. For example, data of access units that match a partial request are retrieved from (or written to) memory banks of the memory unit. In some embodiments, a memory unit may have multiple memory banks and the data of the corresponding partial requests is stored in one or more memory banks of the memory unit. In some embodiments, the data accessed is in response to a partial request decomposed from a larger request spanning multiple access units. In the case of a memory access read operation, the corresponding data is read from memory banks of the memory unit in the event the partial request matches to the memory unit. Similarly, in the case of a memory access write operation, the corresponding data is written to memory banks of the memory unit in the event the partial request matches to the memory unit.

In some embodiments, a partial request is mapped with a corresponding memory unit based on a programmable distribution scheme. For example, different workloads can distribute data to memory units using different distribution schemes configured using a hashing mechanism. In various embodiments, at 505, the hashing mechanism for the configured distribution scheme is used to determine whether the memory unit receiving the memory data request is responsible for the partial request. In the event the memory unit manages that particular address range of the partial request, the corresponding data is retrieved (or written). Otherwise, the partial request is ignored and will be handled by the correct memory unit responsible for that address range.

At 507, partial memory data responses are prepared and sent. For example, data read from memory units is packaged into responses associated with partial requests. In some embodiments, the response prepared corresponding to a read operation is a partial memory data response since it includes only a portion of the requested data. In various embodiments, each partial response includes an identifier such as a sequence identifier for ordering the partial responses into a complete response. The identifier of each partial memory data response can be utilized by a processing element to order a set of partial responses that are received out of order. The response is transmitted to a processing component for one or more processing elements to receive. In some embodiments, the response is an acknowledgement that a request corresponding to the write operation is complete.

Figure 6:
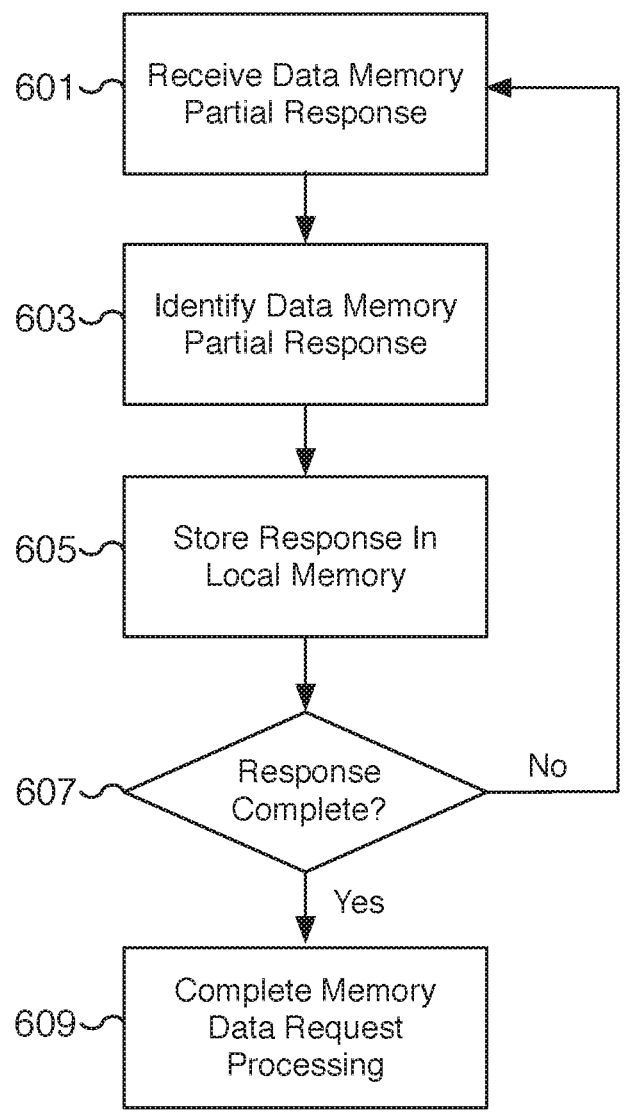
FIG. 6 is a flow chart illustrating an embodiment of a process for performing memory access.

FIG. 6 is a flow chart illustrating an embodiment of a process for performing memory access. For example, a processing element utilizes the process of FIG. 6 to gather data corresponding to a memory data request for a read operation. In some embodiments, a processing element, such as one of processing elements 251, 253, 255, or 257 of FIG. 2, receives partial memory data responses from multiple memory units such as memory units 111, 121, 131, and/or 141 of FIG. 1. In some embodiments, the process of FIG. 6 is performed in response to a memory data request broadcasted at 403 of FIG. 4 and/or in response to partial memory data responses sent using the process of FIG. 5. In some embodiments, the process of FIG. 6 is performed at 405 and/or 407 of FIG. 4 to gather partial responses from a variety of memory units.

At 601, a data memory partial response is received. For example, a partial response to a data memory request sent from a memory unit is received. In various embodiments, the response includes data that is one or more access units in size from the same memory unit. In some embodiments, the response includes identifier information such as a sequence identifier that can be used to order the partial response received relative to other partial responses.

At 603, the data memory partial response is identified. For example, using an identifier included in the received partial response, the data memory partial response is identified relative to the original data memory request. For example, a request may be decomposed or unrolled into five partial requests. The partial response is identified at 603 to determine which of the five partial responses it corresponds to. In some embodiments, the identification is performed by inspecting an identifier such as a sequence identifier. The identification result can be used to determine the ordering of the partial response relative to other partial responses and to reconstruct a complete response from the set of received partial responses.

At 605, a data memory partial response is stored in local memory. For example, data read from memory is extracted from the data payload of a partial response and stored in local memory. In some embodiments, a temporary buffer sized for the requested data is allocated from local memory to construct a complete response from partial responses. Since partial responses may be received out of order relative to their corresponding memory addresses, the data from the partial response is stored in the allocated buffer at a corresponding location based on the relationship of the partial response to the original requested data. For example, a buffer sized for five partial responses is allocated and the data from the received partial response is written to a corresponding address location in the buffer regardless of when the partial response is received. In some embodiments, each partial response is an access unit-sized response or a multiple of an access unit. In various embodiments, the local memory is local memory store 305 of FIG. 3. Using the temporary buffer, a completed data memory response can be reconstructed from partial responses.

At 607, a determination is made whether the response is complete. For example, a response is complete once all partial responses that are required to construct a completed response are received. In the event the response is complete, processing proceeds to 609. In the event the response is not complete, processing loops back to 601 to receive an additional partial response.

At 609, memory data request processing is completed. For example, the data corresponding to a complete response is made available for additional computation such as matrix computation. In some embodiments, the data associated with the completed response is located in local memory such as a local memory store of the processing element. The completed response may be used as input to a matrix compute engine of the processing element. In some embodiments, the completed response corresponds to data describing a neural network or activation data associated with an artificial intelligence problem.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a plurality of memory units, wherein each of the plurality of memory units includes a request processing unit and a plurality of memory banks, wherein the request processing unit of each of the plurality of memory units is configured to decompose a received broadcasted memory request into a corresponding plurality of partial requests and the request processing unit of each of the plurality of memory units is configured to provide a partial response associated with a different one of the corresponding plurality of partial requests; and
a processor coupled to the plurality of memory units, wherein the processor includes a plurality of processing elements and a communication network communicatively connecting the plurality of processing elements to the plurality of memory units, and wherein at least a first processing element of the plurality of processing elements includes a control logic unit and a matrix compute engine, the control logic unit is configured to access data from the plurality of memory units using a dynamically programmable distribution scheme;
wherein the dynamically programmable distribution scheme specifies a parameter of a configurable distribution pattern for dynamically changing mapping scheme of memory addresses specific to a corresponding one of the processing elements to ordering among memory locations of the plurality of memory units, and the dynamically programmable distribution scheme is included in a plurality of different dynamically programmable distribution schemes utilized by different processing elements of the plurality of processing elements that allow different workloads to distribute their corresponding workload data across the plurality of memory units using different corresponding distribution schemes of different corresponding mapping schemes included in the plurality of different dynamically programmable distribution schemes desired for corresponding workloads of the different workloads.

2. The system of claim 1, wherein the broadcasted memory request references data stored in each of the plurality of memory units.

3. The system of claim 1, wherein the request processing unit of each of the plurality of memory units is configured to determine whether each of the corresponding plurality of partial requests corresponds to data stored in a corresponding one of the plurality of memory banks associated with the corresponding request processing unit.

4. The system of claim 1, wherein the control logic unit of the first processing element is configured to receive the partial responses and combine the partial responses to generate a complete response to the broadcasted memory request.

5. The system of claim 4, wherein each of the partial responses includes a corresponding sequence identifier used to order the partial responses.

6. The system of claim 4, wherein the complete response is stored in a local memory of the first processing element.

7. The system of claim 1, wherein the plurality of memory units includes a north memory unit, an east memory unit, a south memory unit, and a west memory unit.

8. The system of claim 1, wherein the dynamically programmable distribution scheme utilizes an identifier associated with a workload of the first processing element.

9. The system of claim 8, wherein two or more processing elements of the plurality of processing elements share the identifier.

10. The system of claim 1, wherein a second processing element of the plurality of processing elements is configured with a different dynamically programmable distribution scheme for accessing memory units than the first processing element.

11. The system of claim 1, wherein the control logic unit of the first processing element is further configured with an access unit size for distributing data across the plurality of memory units.

12. The system of claim 1, wherein data elements of a machine learning weight matrix are distributed across the plurality of memory units using the dynamically programmable distribution scheme.

13. A method comprising:
receiving a memory configuration setting associated with a workload, wherein the workload is associated with a dynamically programmable distribution scheme;
creating a memory access request that includes a workload identifier;
broadcasting the memory access request to a plurality of memory units, wherein the request processing unit of each of the plurality of memory units is configured to decompose a received broadcasted memory request into a corresponding plurality of partial requests and the request processing unit of each of the plurality of memory units is configured to provide a partial response associated with a different one of the corresponding plurality of partial requests;
receiving a plurality of partial responses associated with the memory access request; and
combining the plurality of partial responses to create a complete response to the memory access request;
wherein dynamically programmable distribution scheme specifies a parameter of a configurable distribution pattern for dynamically changing mapping scheme of memory addresses specific to a corresponding one processing element among a plurality of processing elements to ordering among memory locations of the plurality of memory units, and the dynamically programmable distribution scheme is included in a plurality of different dynamically programmable distribution schemes utilized by different processing elements of the plurality of processing elements that allow different workloads to distribute their corresponding workload data across the plurality of memory units using different corresponding distribution schemes of different corresponding mapping schemes included in the plurality of different dynamically programmable distribution schemes desired for corresponding workloads of the different workloads.

14. The method of claim 13, further comprising receiving an access unit size configuration setting.

15. The method of claim 14, wherein the memory access request has a memory request size that is a multiple of the access unit size configuration setting.

16. A method comprising:
receiving a broadcasted memory request associated with a processing element workload wherein the processing element workload is associated with a dynamically programmable distribution scheme;

decomposing the broadcasted memory request into a plurality of partial requests;

determining for each of the plurality of partial requests whether the partial request is to be served from an associated memory bank of a plurality of memory units;

discarding a first group of partial requests that is not to be served from the associated memory bank;

for each partial request of a second group of partial requests that is to be served from the associated memory bank, retrieving data of the partial request;

preparing one or more partial responses using the retrieved data; and providing the prepared one or more partial responses;

wherein dynamically programmable distribution scheme specifies a parameter of a configurable distribution pattern for dynamically changing mapping scheme of memory addresses specific to a corresponding one processing element among a plurality of processing elements to ordering among memory locations of the plurality of memory units, and the dynamically programmable distribution scheme is included in a plurality of different dynamically programmable distribution schemes utilized by different processing elements of the plurality of processing elements that allow different workloads to distribute their corresponding workload data across the plurality of memory units using different corresponding distribution schemes of different corresponding mapping schemes included in the plurality of different dynamically programmable distribution schemes desired for corresponding workloads of the different workloads.

17. The method of claim 16, wherein preparing the one or more partial responses using the retrieved data includes inserting a sequence identifier into each of the one or more partial responses.

18. The method of claim 16, wherein the broadcasted memory request references data stored in each of the plurality of memory units.

19. The method of claim 16, wherein the plurality of memory units includes a north memory unit, an east memory unit, a south memory unit, and a west memory unit.

20. The method of claim 16, wherein data elements of a machine learning weight matrix are distributed across the plurality of memory units using the dynamically programmable distribution scheme.

* * * * *